US010902421B2

(12) United States Patent
Badenhorst

(10) Patent No.: US 10,902,421 B2
(45) Date of Patent: Jan. 26, 2021

(54) PROVISIONING PAYMENT CREDENTIALS TO A CONSUMER

(71) Applicant: Visa International Service Association, San Francisco, CA (US)

(72) Inventor: Cornelius Johannes Badenhorst, Eversdal (ZA)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 861 days.

(21) Appl. No.: 14/906,524

(22) PCT Filed: Jul. 23, 2014

(86) PCT No.: PCT/IB2014/063339
§ 371 (c)(1),
(2) Date: Jan. 20, 2016

(87) PCT Pub. No.: WO2015/011655
PCT Pub. Date: Jan. 29, 2015

(65) Prior Publication Data
US 2016/0162889 A1 Jun. 9, 2016

(30) Foreign Application Priority Data

Jul. 26, 2013 (ZA) .................................. 2013/05673
Sep. 16, 2013 (ZA) .................................. 2013/06923

(51) Int. Cl.
*G06Q 20/40* (2012.01)
*G06Q 20/42* (2012.01)
(Continued)

(52) U.S. Cl.
CPC ........... *G06Q 20/40* (2013.01); *G06Q 20/085* (2013.01); *G06Q 20/229* (2020.05); *G06Q 20/32* (2013.01); *G06Q 20/385* (2013.01); *G06Q 20/42* (2013.01)

(58) Field of Classification Search
CPC ...... G06Q 40/025; G06Q 40/04; G06Q 40/00; G06Q 40/02; G06Q 20/10; G06Q 20/102;
(Continued)

(56) References Cited

U.S. PATENT DOCUMENTS 5,613,012 A 3/1997 Hoffman
5,781,438 A 7/1998 Lee
(Continued)

FOREIGN PATENT DOCUMENTS

CN 102754114 10/2012
CN 102831734 12/2012
(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
(Continued)

*Primary Examiner* — Hani M Kazimi
(74) *Attorney, Agent, or Firm* — Kilpatrick Townsend & Stockton LLP

(57) ABSTRACT

A method and system for provisioning payment credentials to a consumer are disclosed. A remotely accessible server receives a request for payment credentials required to conduct a transaction, the request originating from an electronic device of a consumer. A transaction type associated with the transaction is determined, the transaction type being one of a plurality of predefined transaction types wherein each
(Continued)

transaction type is associated with a predefined payment credential format. The remotely accessible server obtains payment credentials in the payment credential format associated with the determined transaction type and transmits the obtained payment credentials to the electronic device of the consumer for use in conducting the transaction.

17 Claims, 8 Drawing Sheets

(51) Int. Cl.
  *G06Q 20/32* (2012.01)
  *G06Q 20/38* (2012.01)
  *G06Q 20/22* (2012.01)
  *G06Q 20/08* (2012.01)

(58) Field of Classification Search
  CPC ........ G06Q 20/40; G06Q 30/02; G06Q 30/04; G06Q 30/06
  USPC ...................................................... 705/39–43
  See application file for complete search history.

(56) References Cited

U.S. PATENT DOCUMENTS

| | | |
|---|---|---|
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, Ii |
| 7,784,685 B1 | 8/2010 | Hopkins, Iii |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, Ii |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, Ii |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, Iii |
| 7,996,288 B1 | 8/2011 | Stolfo |
| 8,025,223 B2 | 9/2011 | Saunders |
| 8,028,896 B2 | 10/2011 | Carter et al. |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, Iii |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, Ii |
| 8,336,088 B2 | 12/2012 | Raj et al. |
| 8,346,666 B2 | 1/2013 | Lindelsee et al. |
| 8,376,225 B1 | 2/2013 | Hopkins, Iii |
| 8,380,177 B2 | 2/2013 | Laracey |
| 8,387,873 B2 | 3/2013 | Saunders |
| 8,401,539 B2 | 3/2013 | Beenau |

(56) References Cited

U.S. PATENT DOCUMENTS

| | | |
|---|---|---|
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,838,982 B2 | 9/2014 | Carlson et al. |
| 8,887,308 B2 | 11/2014 | Grecia |
| 9,065,643 B2 | 6/2015 | Hurry et al. |
| 9,070,129 B2 | 6/2015 | Sheets et al. |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0097320 A1 | 5/2005 | Golan et al. |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0250244 A1* | 10/2008 | Baentsch .............. H04L 9/0827 713/168 |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft et al. |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0031328 A1* | 2/2010 | Hodgkinson .......... G06F 21/33 726/5 |
| 2010/0082444 A1 | 4/2010 | Lin et al. |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |

(56) References Cited

U.S. PATENT DOCUMENTS

| | | |
|---|---|---|
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, Ii |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0084200 A1 | 4/2012 | Triana |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0157062 A1 | 6/2012 | Kim et al. |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0239531 A1* | 9/2012 | McCann ............... G06Q 10/06 705/26.41 |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2012/0323717 A1 | 12/2012 | Kirsch |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0061299 A1* | 3/2013 | Novak ................... H04L 67/10 726/6 |
| 2013/0081122 A1 | 3/2013 | Svigals |
| 2013/0091028 A1 | 4/2013 | Oder ("J.D."), Ii |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0238455 A1* | 9/2013 | Laracey ............... G06Q 20/108 705/21 |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |

(56) References Cited

U.S. PATENT DOCUMENTS

| | | |
|---|---|---|
| 2013/0262317 A1* | 10/2013 | Collinge ............ G06Q 20/3823 705/71 |
| 2013/0275300 A1 | 10/2013 | Killian |
| 2013/0275307 A1* | 10/2013 | Khan .................... G06Q 20/40 705/64 |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1* | 1/2015 | Sheets ................ G06Q 20/3278 705/71 |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0206129 A1* | 7/2015 | Perez Lafuente ... H04L 63/0807 705/44 |
| 2015/0220917 A1 | 8/2015 | Aabye et al. |
| 2015/0227932 A1* | 8/2015 | Huxham .............. G06Q 20/027 705/76 |
| 2015/0235215 A1* | 8/2015 | Kumar .................... G06F 21/31 705/44 |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0048833 A1* | 2/2016 | Huxham ............ G06Q 20/3226 705/71 |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |

FOREIGN PATENT DOCUMENTS

| | | |
|---|---|---|
| CN | 103186850 | 7/2016 |
| EP | 2156397 A1 | 2/2010 |
| KR | 10-2012-0105296 A | 9/2012 |
| KR | 10-2012-0125443 A | 11/2012 |
| WO | 0052557 | 9/2000 |
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2009112793 | 9/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012/151590 A2 | 11/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request via Access Device filed Nov. 25, 2015.

(56) References Cited

OTHER PUBLICATIONS

Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Extended European Search Report dated Mar. 22, 2016 in European Patent Application No. 14828863.2, 6 pages.
International Search Report and Written Opinion dated Dec. 18, 2014 in PCT/IB2014/063339, 11 pages.
CN201480042162.X , "Office Action", dated Jan. 14, 2019, 10 pages.
CN201480042162.X , "Office Action", dated Nov. 21, 2019, 11 pages.
EP14828863.2 , "Summons to Attend Oral Proceedings", Nov. 8, 2019, 11 pages.
CN201480042162.X , "Office Action", dated Mar. 23, 2020, 13 pages.

* cited by examiner

PROVISIONING PAYMENT CREDENTIALS TO A CONSUMER

CROSS-REFERENCES TO RELATED APPLICATIONS

This application is a National Stage of International Application No. PCT/IB2014/063339, International Filing Date Jul. 23, 2014 and which claims the benefit of South African Provisional Patent Application No. 2013/05673, filed on Jul. 26, 2013 and South African Provisional Patent Application No. 2013/06923, filed on Sep. 16, 2013, the disclosures of all applications being incorporated herein by reference.

BACKGROUND

Various systems and methods are used to provision payment credentials to a consumer for the purpose of conducting one or more financial transactions.

Such payment credentials typically include payment account details such as a card number in the form of a Primary Account Number (PAN), a card expiry date and/or a Card Verification Value (CVV). Alternatively, or in combination with payment account details, the payment credentials may also include a passphrase, passcode, Personal Identification Code (PIN), or the like. These payment credentials may, for example, be valid for only a single use (often referred to as "one-time payment credentials") or for a predefined timeframe.

In one example of such a system, a consumer requests payment credentials using a mobile device. If authorized, payment credentials including a single-use PAN are issued to the consumer. The consumer may then provide the payment credentials to a merchant in order to conduct a transaction.

Provisioning payment credentials to a consumer in this manner may present security risks. For example, payment credentials may be intercepted by unscrupulous parties and used for conducting fraudulent transactions. Furthermore, systems and methods for provisioning payment credentials to consumers may be inflexible in the sense that they are limited to a single payment credential format, which may not be accepted at all payment acceptance points.

The present invention aims to alleviate these and other problems, at least to some extent.

BRIEF SUMMARY

In accordance with the invention there is provided a method of provisioning payment credentials to a consumer, the method conducted at a remotely accessible server and comprising the steps of:

receiving a request for payment credentials required to conduct a transaction, the request originating from an electronic device of a consumer;

determining a transaction type associated with the transaction, the transaction type being one of a plurality of predefined transaction types wherein each transaction type is associated with a predefined payment credential format;

obtaining payment credentials in the payment credential format associated with the determined transaction type; and transmitting the obtained payment credentials to the electronic device of the consumer for use in conducting the transaction.

Further features provide for the request for payment credentials to include a consumer transaction selection; for the transaction type to be determined at least partially based on the consumer transaction selection included in the request; and for the step of determining the transaction type associated with the transaction to include checking an account type associated with an account of the consumer and determining the transaction type at least partially based on the account type. The transaction type may be obtained from a consumer record stored in a database containing details of the account of the consumer.

The account type may be one of an account associated with a corresponding physical payment card and an account not associated with a corresponding physical payment card. Different predefined payment credential formats may be respectively associated with an account associated with a corresponding physical payment card and an account not associated with a corresponding physical payment card.

Yet further features provide for the account to be a mobile wallet account; for the remotely accessible server to be operated by a mobile banking system; and for the transaction to be a mobile banking transaction.

The request for payment credentials may be a request for single-use payment credentials. Alternatively, the payment credentials may be valid for conducting a plurality of transactions of the transaction type or for conducting one or more transactions of the transaction type within a predefined timeframe.

Still further features provide for the step of obtaining payment credentials in the payment credential format associated with the transaction type to include requesting the payment credentials from an external credential generating module; alternatively, for the step of obtaining payment credentials in the payment credential format associated with the transaction type to include generating the payment credentials at the remotely accessible server.

Further features provide for the request for payment credentials to include a consumer identifier; for the consumer identifier to be an identifier of the electronic device of the consumer; and for the electronic device of the consumer to be a mobile phone. The identifier of the electronic device of the consumer may be a Mobile Subscriber Integrated Services Digital Network Number (MSISDN) of the mobile phone of the consumer.

The payment credential format associated with the determined transaction type may include one or a combination of: a bank account number, a Primary Account Number (PAN), a pseudo PAN, a card expiry date, a Card Verification Value (CVV), a passcode, a passphrase, a Personal Identification Number (PIN), a token, a barcode, and a Quick Response (QR) code.

The predefined transaction types may include: an e-commerce transaction, an online payment, an online banking transaction, a physical card present transaction, a mobile banking transaction, a money transfer, an agent cash-out transaction, a cardless withdrawal or purchase transaction, an automated teller machine (ATM) cash withdrawal, a transaction against an account associated with a corresponding physical payment card, or a transaction against an account not associated with a corresponding physical payment card.

A further feature provides for the predefined transaction types to include an ATM cash withdrawal, and for the payment credential format associated with the ATM cash withdrawal to be a PAN and a PIN.

According to one aspect, the account type is an account associated with a corresponding physical payment card, the physical payment card having a static PAN, the predefined transaction types include an ATM cash withdrawal, and the payment credential format associated with the ATM cash withdrawal is a PIN only.

A yet further feature provides for the predefined transaction types to include an e-commerce transaction, and for the payment credential format associated with the e-commerce transaction to be a PAN, a card expiry date, and a CVV.

According to a further aspect, the account type is an account associated with a corresponding physical payment card, the physical payment card having a static PAN, the predefined transaction types include an e-commerce transaction, and the payment credential format associated with the e-commerce transaction is a card expiry date and a CVV.

A still further feature provides for the predefined transaction types to include an agent cash-out transaction, and for the payment credential format associated with the agent cash-out transaction to be a PAN.

Further features provide for the step of receiving the request for payment credentials to be preceded by the step of establishing a communication channel with the electronic device of the consumer; for communications between the remotely accessible server and the electronic device of the consumer to be by way of one of Short Message Service (SMS) protocol, Unstructured Supplementary Service Data (USSD) protocol, a secure Internet connection, and data communication enabled by a mobile software application installed on the electronic device of the consumer.

The invention extends to a system for provisioning payment credentials to a consumer, the system comprising a remotely accessible server in communication with an electronic device of a consumer, the remotely accessible server including:

a request receiving component for receiving a request for payment credentials required to conduct a transaction, the request originating from the electronic device of the consumer;

a type determining component for determining a transaction type associated with the transaction, the transaction type being one of a plurality of predefined transaction types wherein each transaction type is associated with a predefined payment credential format;

a credential obtaining component for obtaining payment credentials in the payment credential format associated with the determined transaction type; and a transmitting component for transmitting the obtained payment credentials to the electronic device of the consumer for use in conducting the transaction.

Further features provide for the credential obtaining component to be configured to request the payment credentials required to conduct the transaction from an external credential generating module; for the external credential generating module to be operated by an issuer of the consumer or by a payment processor; and for the issuer to be an issuing bank of the consumer; alternatively, for the credential obtaining component to be configured to generate the payment credentials.

The invention may further extend to a computer program product for provisioning payment credentials to a consumer, the computer program product comprising a computer-readable medium having stored computer-readable program code for performing the steps of:

receiving a request for payment credentials required to conduct a transaction, the request originating from an electronic device of a consumer;

determining a transaction type associated with the transaction, the transaction type being one of a plurality of predefined transaction types wherein each transaction type is associated with a predefined payment credential format;

obtaining payment credentials in the payment credential format associated with the determined transaction type; and transmitting the obtained payment credentials to the electronic device of the consumer for use in conducting the transaction.

The computer-readable medium may be a non-transitory computer-readable medium, and the computer-readable program code may be executable by a processing circuit.

In order for the invention to be more fully understood, implementations thereof will now be described with reference to the accompanying drawings.

DETAILED DESCRIPTION WITH REFERENCE TO THE DRAWINGS

A system and method for provisioning payment credentials to a consumer is provided. A remotely accessible server receives a request for payment credentials required to conduct a transaction, the request originating from an electronic device of a consumer. A transaction type associated with the transaction is determined, the transaction type being one of a plurality of predefined transaction types wherein each transaction type is associated with a predefined payment credential format. The remotely accessible server obtains payment credentials in the payment credential format associated with the determined transaction type. These payment credentials are then transmitted to the electronic device of the consumer for use in completing the transaction.

Figure 1A:
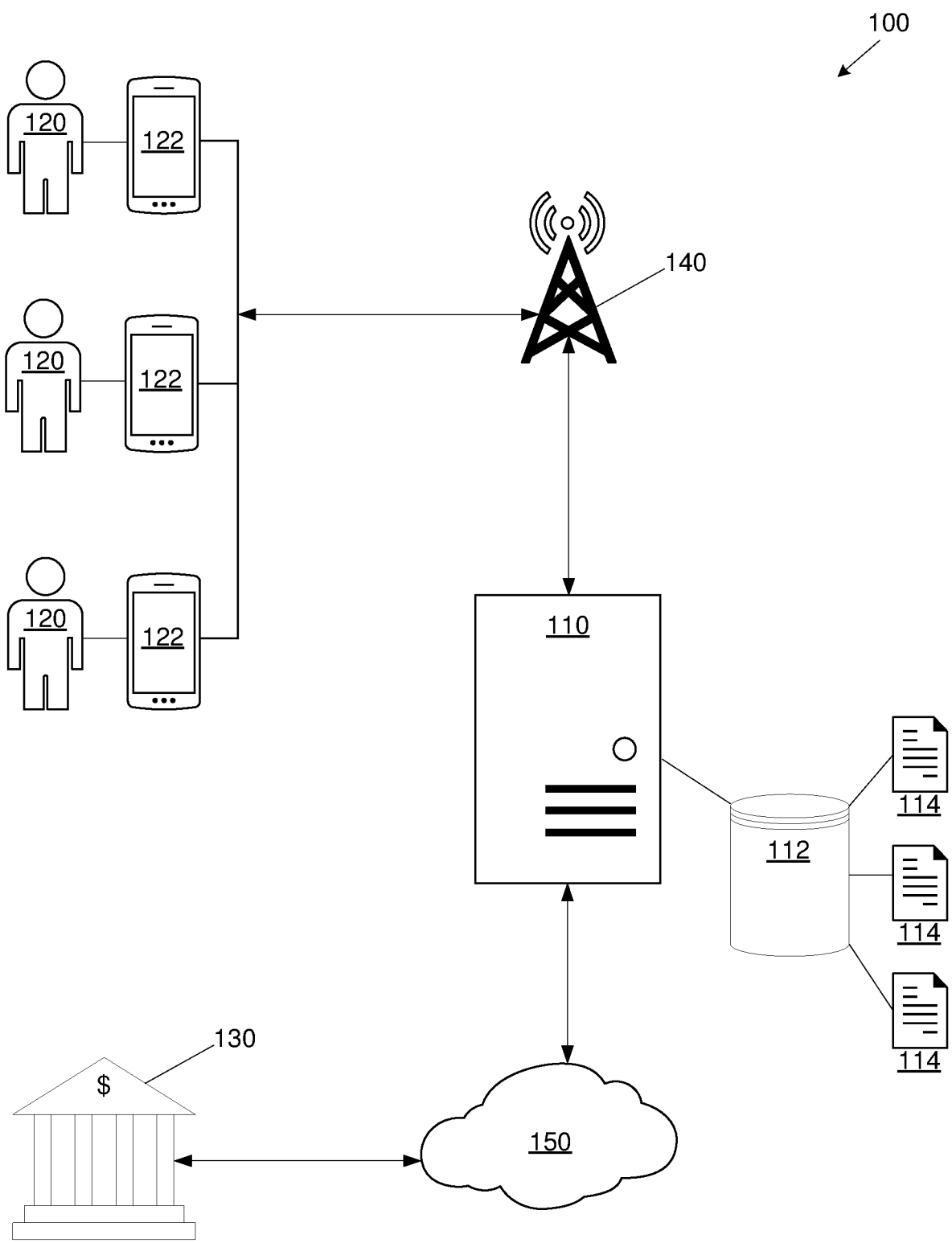
FIG. 1A is a schematic diagram illustrating an embodiment of a system for provisioning payment credentials to a consumer according to the invention.

FIG. 1A illustrates an embodiment of a system (100) for provisioning payment credentials to a consumer. The system (100) comprises a remotely accessible server (110), a plurality of consumers (120) each having an electronic device (122), and an issuer (130).

The remotely accessible server (110) has access to a database (112) containing a plurality of consumer records (114). In one embodiment, the remotely accessible server (110) is one or more mobile money servers of a mobile banking system, typically operated by an entity known as a mobile money operator. In such a case, each consumer (120) may have a registered mobile wallet account held at the remotely accessible server (110) and the consumer record (114) contains details thereof, such as a consumer account number, a consumer account type, personal information of the consumer, funds available, details of payment instruments, payment credential formats, or the like. In further embodiments, the remotely accessible server (110) is a server of a traditional financial institution such as a bank or other financial services provider.

The electronic device (122) may be any electronic communications device capable of communicating over a communications network, such as a cellular communications network. The term should be interpreted to specifically include all mobile or cellular phones, including so-called "feature phones" and smartphones, and may also include other electronic devices such as computers, laptops, handheld personal computers, personal digital assistants, tablet computers, and the like.

In the embodiment of FIG. 1A, the electronic device (122) is a mobile phone of the consumer (120). In the case where the electronic device (122) is a mobile phone and the remotely accessible server (110) is associated with a mobile money operator, a mobile money or mobile banking platform may typically be used to allow the consumer (120) to conduct financial transactions via the electronic device (122).

Examples of well-known mobile money transactions are cash-in transactions, cash-out transactions, person-to-person payments, top-up of airtime services, and bill payments. Cash-out transactions may include cash-outs at mobile money agents and/or automated teller machine (ATM) cash withdrawals.

The remotely accessible server (110) is configured to transmit communications to and receive communications from the electronic devices (122) over a communications network, which is a mobile communications network (140) in this embodiment. The remotely accessible server (110) is further configured to receive communications from and transmit communications to the issuer (130) over a communications network, which may be, among many others, a mobile communications network or, as in the embodiment of FIG. 1A, the Internet (150).

Embodiments provide for communications between the remotely accessible server (110) and the electronic device (122) and/or between the remotely accessible server (110) and the issuer (130) to be secure communications across an encrypted communication channel such as Hypertext Transfer Protocol Secure (HTTPS), Transport Layer Security/Secure Sockets Layer (TLS/SSL) or other secure channel or channels.

The issuer (130) may be any entity authorized to issue payment credentials to the consumer (120). In this embodiment, the issuer (130) is an issuing bank of the consumer (120). In another embodiment, the issuer (130) may be a secure financial gateway or a payment processing network. In some embodiments, the issuer is an issuer processor, in other words, a payment processing entity that can connect financial service providers such as mobile money operators to a payment processing network such as VisaNet™.

The remotely accessible server (110) may include a request receiving component (115) for receiving a request for payment credentials required to conduct a transaction, a type determining component (116) for determining a transaction type associated with the transaction, a credential obtaining component (117) for obtaining payment credentials in the payment credential format associated with the determined transaction type, and a transmitting component (118) for transmitting the obtained payment credentials to the electronic device (122) of the consumer (120) for use in conducting the transaction.

Figure 1B:
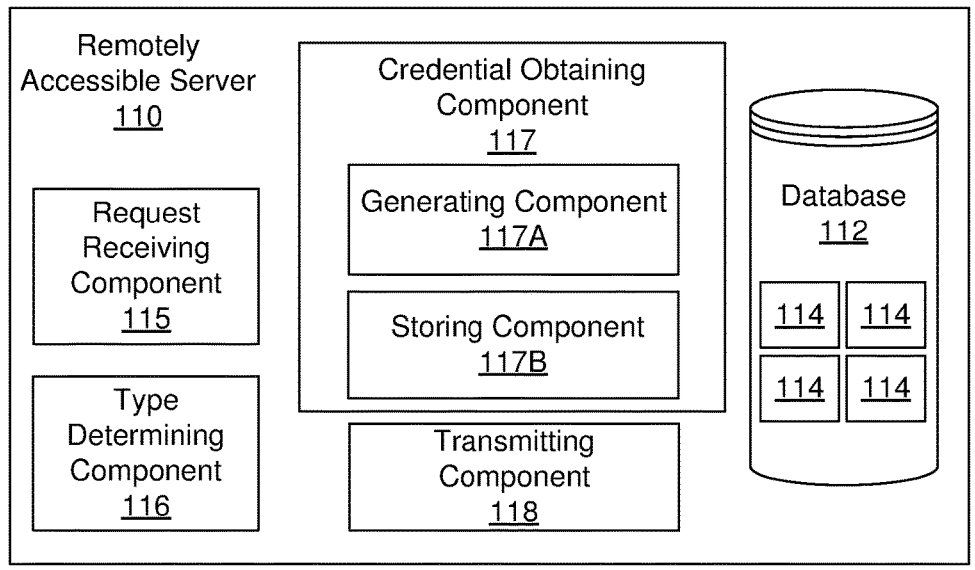
FIG. 1B is a block diagram illustrating a first embodiment of a remotely accessible server according to the invention.

In one embodiment, the credential obtaining component (117) may include a generating component (117A) and a storing component (117B). In such a case, the credential obtaining component (117) is configured to generate the payment credentials and the remotely accessible server (110) may therefore generate the payment credentials itself. This embodiment is illustrated in FIG. 1B.

Figure 1C:
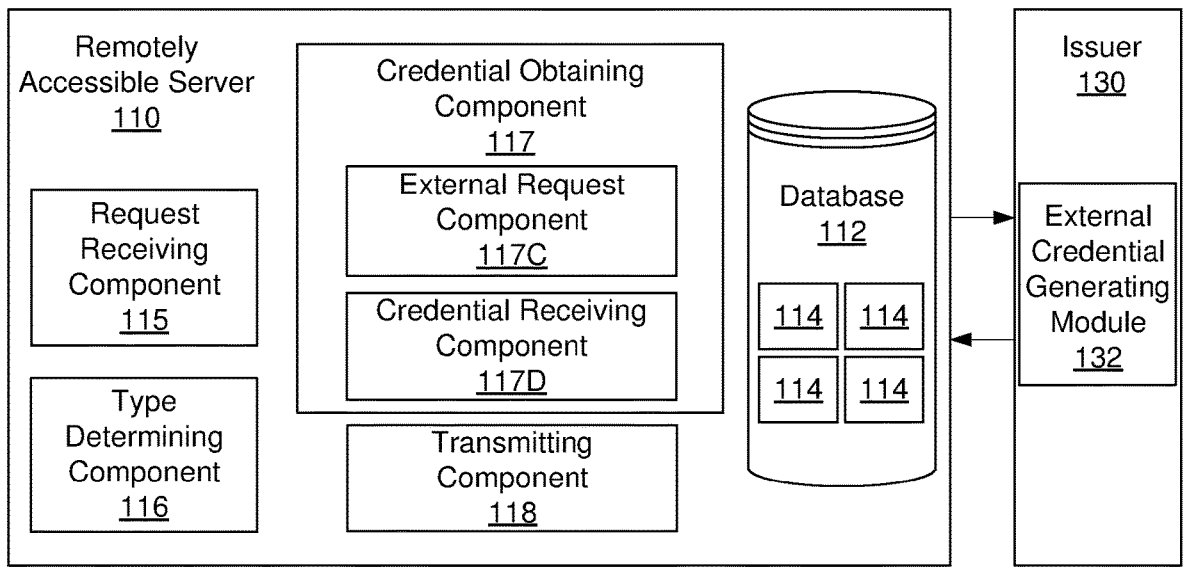
FIG. 1C is a block diagram illustrating a second embodiment of a remotely accessible server according to the invention.

In another embodiment, the credential obtaining component (117) is configured to request the payment credentials required to conduct the transaction from an external credential generating module (132), which may typically be operated by the issuer (130). In such a case, the credential obtaining component (117) may include an external request component (117C) and a credential receiving component (117D) in order to be capable of requesting payment credentials from the external credential generating module (132) and receiving the requested payment credentials, respectively. This embodiment is illustrated in FIG. 1C, which is similar to FIG. 1B. Like reference numerals in FIGS. 1A, 1B and 1C refer to like components and entities.

In some embodiments, the external credential generating module may be operated by a payment processing network such as VisaNet™. The payment processing network may include data processing subsystems, networks, and operations used to support and deliver authorization services, exception file services, and clearing and settlement services. Payment processing networks, for example, VisaNet™, are able to process credit card transactions, debit card transactions, and other types of commercial transactions. Furthermore, the payment processing network may include one or more servers and may use any suitable wired or wireless network, including the Internet.

The system (100) enables the consumer (120) to use the electronic device (122) to request payment credentials for use in conducting a transaction. The system (100) may also be configured to carry out at least a portion of the transaction or to complete the transaction. The remotely accessible server (110) associates different payment credential formats with different types of transactions and provisions credentials to consumers accordingly, as will be described in greater detail below.

Figure 2:
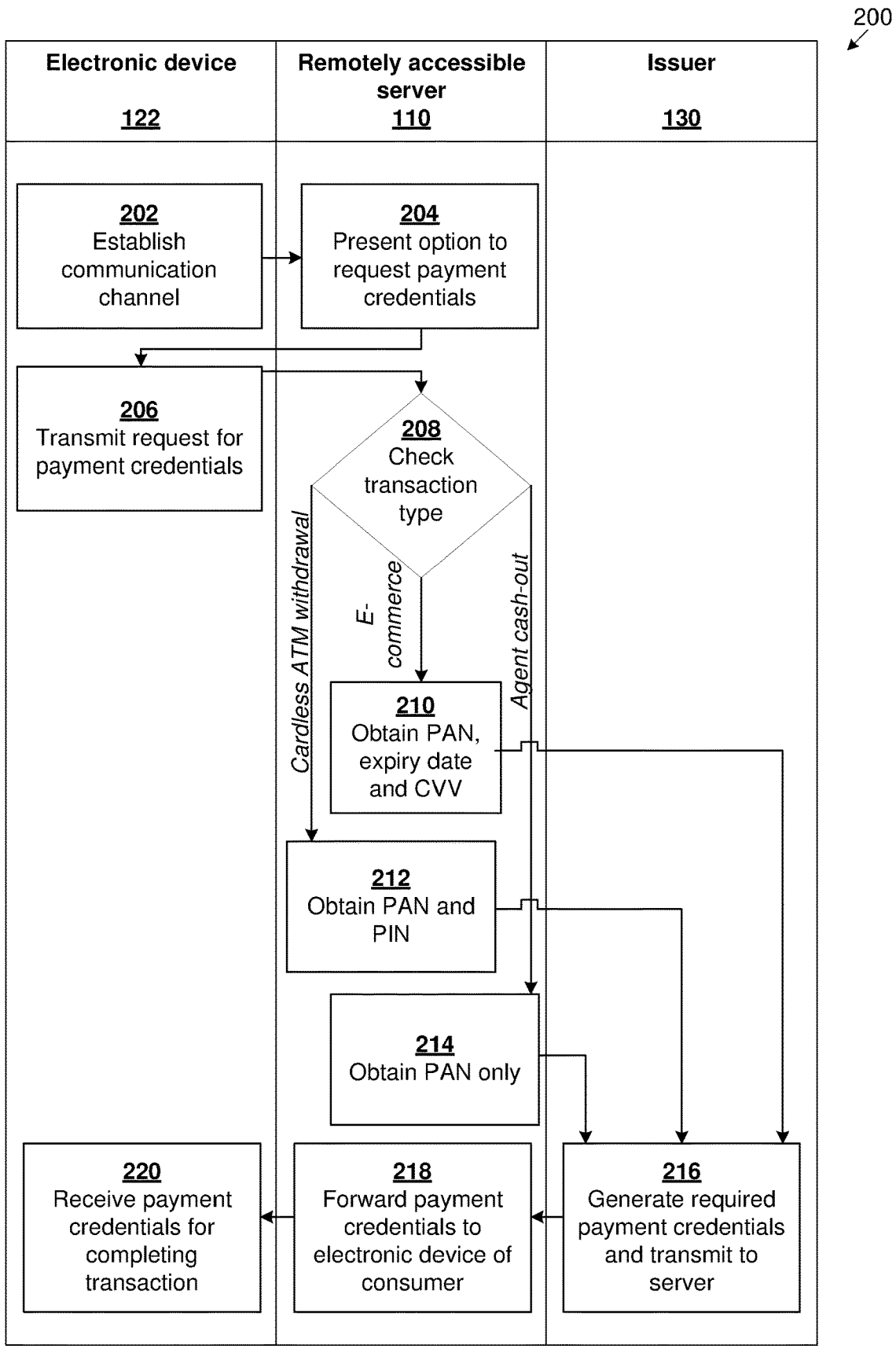
FIG. 2 is a swim-lane flow diagram illustrating a method of provisioning payment credentials to a consumer using the system of FIG. 1A.

The flow diagram (200) of FIG. 2 illustrates an example of a method of provisioning payment credentials to a consumer using the system of FIG. 1. The consumer (120) has a mobile wallet account and is capable of using the electronic device (122) to conduct mobile banking transactions. In this example, the consumer requests single-use ("one-time") payment credentials for use in conducting a single transaction of a particular transaction type.

At a first stage (202), the consumer (120) uses the electronic device (122) to establish a communication channel with the remotely accessible server (110). Communications between the remotely accessible server (110) and the electronic device (122) of the consumer (120) may typically be effected by way of Short Message Service (SMS) protocol, Unstructured Supplementary Service Data (USSD) protocol, over a secure Internet connection, or by way of data communication enabled by a mobile software application installed on the electronic device of the consumer. In this example, a USSD session is initiated.

At a next stage (204), the remotely accessible server (110) presents the electronic device (122) with the option to request payment credentials. Typically, this is presented as a menu option on a display of the electronic device (122). For example, the consumer (120) may be presented with a menu option "Generate one-time payment credentials" in a USSD menu.

The consumer (120), at a next stage (206), requests payment credentials to be generated. In this embodiment, the consumer (120) also specifies a transaction type for which the credentials are required. The consumer (120) may, for example, have the option of selecting one of the following transaction types: an ATM cash withdrawal, an e-commerce transaction, or an agent cash-out transaction to be performed at a mobile money agent. The term "ATM cash withdrawal" used herein may refer to cash withdrawals or cash-outs performed with or without a payment card at an ATM. In other words, the consumer may be able to effect an ATM cash withdrawal without a physical card. Such a withdrawal is known as a cardless ATM cash withdrawal.

The request for payment credentials is typically accompanied by a consumer identifier. In a preferred embodiment, for example in a USSD-based system, this identifier is a Mobile Subscriber Integrated Services Digital Network Number (MSISDN) of a mobile phone used by the consumer (120) to request the payment credentials. Alternatively, the consumer identifier may be obtained by requiring the consumer to log into a secure software application or website by, for example, inputting a username and password.

The remotely accessible server (110) receives the request for payment credentials which originates from the electronic device (122) and then, at a next stage (208), checks the transaction type received from the electronic device (122) of the consumer (120), and looks up a payment credential format associated with the transaction type received in the database (112). In this embodiment, therefore, a consumer transaction selection is used to determine the transaction type. The payment credential format is selected from a plurality of predefined payment credential formats, each transaction type selectable by the consumer being associated with a predefined payment credential format.

It is envisaged that one or more validation steps may take place before the payment credentials are generated and/or transmitted to the consumer (120). For example, the consumer (120) may be required to enter a PIN or undergo a two and/or three factor authentication process.

The remotely accessible server (110) is configured to look up a payment credential format corresponding to the transaction type. Payment credentials are then obtained in accordance with the specified format and transmitted to the electronic device (122) of the consumer (120). Numerous payment credential formats may be used, depending on which transactions or payment credential requests the remotely accessible server (110) supports.

For example, and among many others, the transactions supported may include an e-commerce transaction, an online payment, an online banking transaction, a physical card present transaction, a mobile banking transaction, a money transfer, an agent cash-out transaction, a cardless withdrawal or purchase transaction, an ATM cash withdrawal, a transaction against an account associated with a corresponding physical payment card, and a transaction against an account not associated with a corresponding physical payment card. Each supported transaction type is associated with a specific, predefined payment credential format, which may be the same for two or more transaction types.

The payment credentials can be generated and transmitted to the consumer (120) in, for example and not limited to, any one or any combination of the following formats: a bank account number, a Primary Account Number (PAN), a pseudo PAN, a card expiry date, a Card Verification Value (CVV), a passcode, a passphrase, a Personal Identification Number (PIN), a token, a barcode, a payment reference number, and a Quick Response (QR) code. The term "pseudo PAN" should be interpreted broadly and includes a token associated with an actual PAN, credentials formatted as a PAN, and obfuscated PANs. Any suitable token which is uniquely associated with payment credentials of the consumer which can be used to complete a transaction against the account of the consumer may be generated and transmitted to the electronic device (122) of the consumer.

For example, for a transaction of type "A", the payment credential format associated with the transaction may be a PAN and a PIN. For a transaction of type "B", the payment credential format associated with the transaction may be a QR code. For a transaction of type "C", the payment credential format associated with the transaction may be a pseudo PAN. Consumers may thus receive different payment credentials based on the transaction type of the proposed transaction.

In the embodiment illustrated in FIG. 2, if the transaction type is an e-commerce transaction, the remotely accessible server (110), at a next stage (210), requests the issuer (130) to generate a PAN, a card expiry date, and a CVV as payment credentials for a single use. If the transaction type received from the electronic device (122) of the consumer (120) is an ATM cash withdrawal, the remotely accessible server (110), at a next stage (212), requests the issuer (130) to generate a PAN and a PIN as payment credentials for a single use. Alternatively, if the transaction type received from the electronic device (122) of the consumer (120) is an agent cash-out transaction, the remotely accessible server (110), at a next stage (214), requests the issuer (130) to generate only a PAN as a payment credential for a single use.

In this embodiment, the payment credentials are generated by the issuer (130) and obtained from issuer (130) by the remotely accessible server (110). In such a case, when the consumer (120), after having received the credentials, subsequently presents these payment credentials to conduct a transaction, the issuer (130) may typically verify that the payment credentials presented match the payment credentials originally generated before ultimately authorizing the transaction. Alternatively, the payment credentials may be generated by the remotely accessible server (110) without routing the request to the issuer (130). In such a case, either or both of an acquirer or the issuer (130) will request the remotely accessible server (110) to validate any payment credentials received before authorizing a transaction, in order to check whether received payment credentials are validly generated payment credentials for the specific transaction or transaction type.

At a next stage (216), the issuer (130) generates the payment credentials in the required format and transmits the credentials to the remotely accessible server (110). These payment credentials are then forwarded, at a next stage (218), from the remotely accessible server (110) to the electronic device (122) of the consumer (120). The consumer (120), at a final stage (220), receives the payment credentials and may then use them to conduct either one or more transactions only of the specific type, or one or more transactions of various transaction types as long as the payment credentials are accepted payment credentials for each specific transaction type.

After the payment credentials are forwarded to the electronic device (122) of the consumer (120), it can be used for conducting at least one financial transaction of the particular transaction type. The payment credentials may be single-use ("one-time") payment credentials for conducting one transaction of the particular transaction type. For example, the consumer (120) may request one-time payment credentials for conducting an e-commerce transaction. The remotely accessible server (110) then associates this transaction type with a specific payment credential format, for example, a PAN, a card expiry date, and a CVV in combination. These credentials may then be used once to conduct an e-commerce transaction.

In some embodiments, payment credentials may only be used to conduct the specific transaction type. However, it should be appreciated that, in alternative embodiments, payment credentials may equally be used to conduct any transaction for which the particular payment credentials are accepted. For example, in the case of a request for payment credentials for an e-commerce transaction, the consumer (120) may use the PAN received with the card expiry date and CVV to perform an agent cash-out transaction at a mobile money agent in a mobile banking environment, in the case where only a PAN is required to conduct such a transaction.

Furthermore, the payment credentials may be valid for conducting a plurality of transactions of the transaction type, or alternatively, the payment credentials may have a limited period of validity and may be valid for conducting one or more transactions of the transaction type within a predefined timeframe.

The type of transaction for which the payment credentials are requested may be determined by the remotely accessible server (110), for example, from user account information stored in the database (112) or from a consumer selection in the request itself as is the case in the example of FIG. 2. Alternatively, it may be determined from further information in the request for payment credentials.

The remotely accessible server (110) may distinguish between transactions against an account associated with a corresponding physical payment card, and transactions against an account not associated with a corresponding physical payment card. In such cases, determining the transaction type associated with a transaction may include checking an account type associated with an account of the consumer and determining the transaction type at least partially based on the account type.

For example, the consumer may have only a virtual account which is not associated with a physical payment card. When the consumer requests payment credentials, the transaction type may be obtained from a consumer record stored in the database containing details of the account of the consumer, which indicates that the consumer does not have a physical payment card. This feature will be described in greater detail below.

In a mobile banking system or similar payment network, some consumers may have a physical payment card or "companion plastic card" having payment credentials (e.g. PAN, expiry date and/or CVV) physically provided thereon and/or stored on a chip and/or magnetic stripe of the card, while other consumers may only have payment credentials which are electronically stored or which are dynamic and must be electronically requested. In such cases, consumers may necessarily require different payment credentials for performing transactions.

For example, in a mobile banking system which makes use of PANs for processing so-called "open-loop" mobile payment transactions between various separate mobile money deployments, if a consumer has an account associated with a physical payment card and requests to perform an agent cash-out transaction, a withdrawal, or a payment transaction, the consumer would already be in possession of a PAN to use for the transaction, as the PAN is typically provided on the payment card. This implementation is referred to as an account with a "static" PAN or permanent PAN.

Contrastingly, if a consumer who does not have a corresponding physical payment card requests to perform such a transaction, the consumer may not have a static PAN and the issuer would need to provide the consumer with a PAN in order for the consumer to complete the desired transaction.

Figure 3:
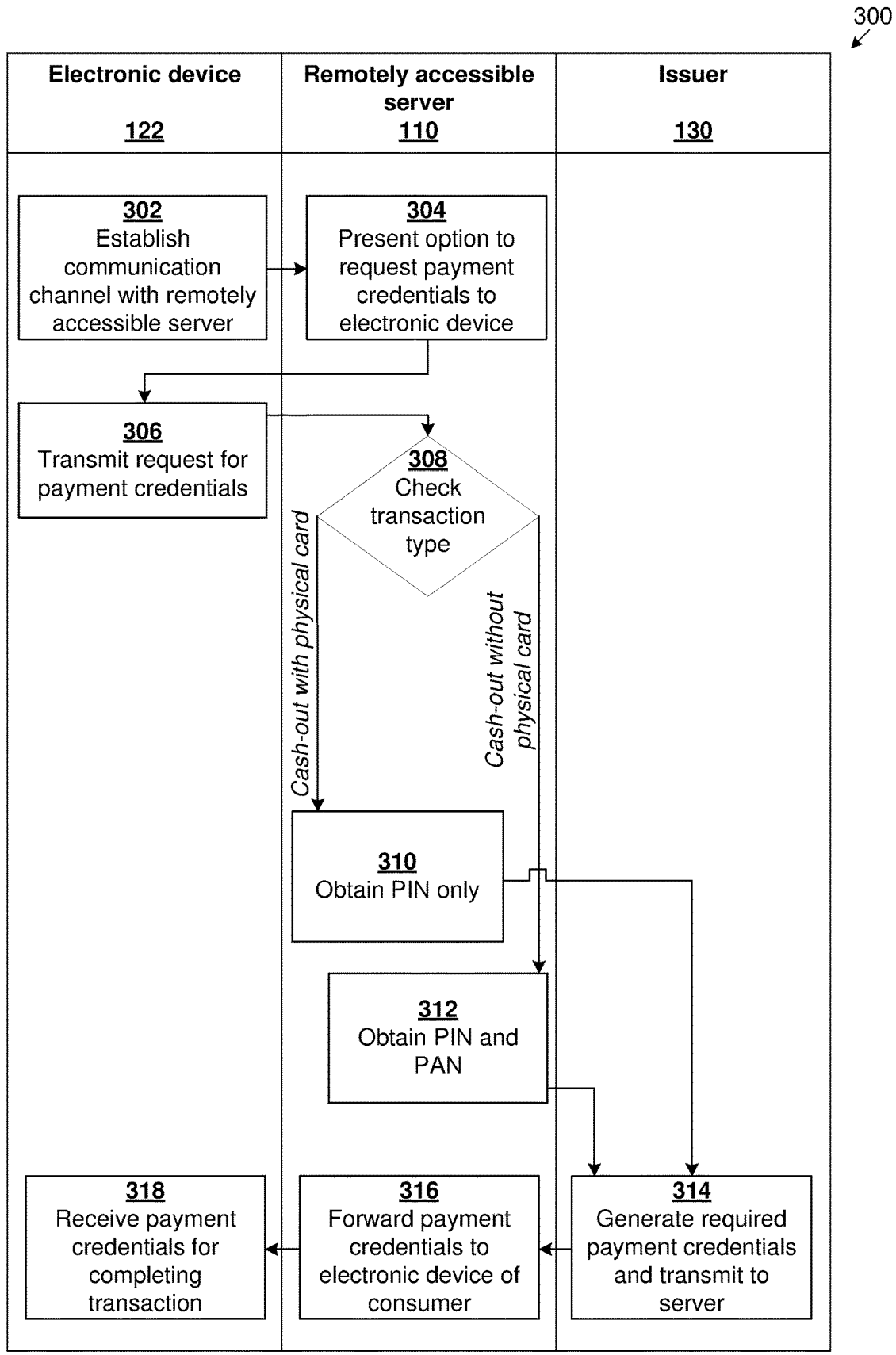
FIG. 3 is a swim-lane flow diagram illustrating a method of provisioning payment credentials to a consumer using the system of FIG. 1A.

The swim-lane flow diagram (300) of FIG. 3 illustrates a further example of a method of provisioning payment credentials to a consumer, using the system of FIG. 1A. In this example, the remotely accessible server (110) is configured to distinguish between accounts associated with physical payment cards and accounts not associated with physical payment cards.

At a first stage (302), the consumer (120) uses the electronic device (122) to establish a communication channel with the remotely accessible server (110). At a next stage (304), the remotely accessible server (110) presents the electronic device (122) with the option to request payment credentials.

The consumer (120), at a next stage (306), requests payment credentials to be generated. In this embodiment, the consumer (120) selects to receive payment credentials for performing a cash-out transaction. The consumer (120) may have the option of selecting an ATM cash-out or an agent cash-out transaction to be performed at a mobile money agent. The remotely accessible server (110) then uses the selection and additionally determines whether or not the consumer (120) has a corresponding physical payment card, in other words, a static PAN.

The remotely accessible server (110) then, at a next stage (308), checks the transaction type received and/or derived as described above, and looks up a payment credential format associated with the transaction type in the database (112). If the transaction type is a transaction against an account associated with a corresponding physical payment card, the remotely accessible server (110), at a next stage (310), requests the issuer (130) to generate only a one-time PIN. If the transaction type is a transaction against an account not associated with a corresponding physical payment card, the remotely accessible server (110), at a next stage (312), requests the issuer (130) to generate a one-time PIN and a one-time PAN.

The remotely accessible server (110) typically checks the consumer record (114) in the database (112) to determine whether or not the consumer (120) requires a one-time PAN to complete the transaction.

At a next stage (314), the issuer (130) generates the payment credentials in the required format and transmits the payment credentials to the remotely accessible server (110). These payment credentials are then forwarded, at a next stage (316), from the remotely accessible server (110) to the electronic device (122) of the consumer (120). The consumer (120), at a final stage (318), receives the payment credentials and may then use them to conduct either one or more transactions only of the specific type, or one or more transactions of various transaction types as long as the payment credentials are accepted payment credentials for each specific transaction type.

It should be appreciated that in some embodiments a consumer transaction selection may be provided to the remotely accessible server, and the transaction type may be determined at least partially based on the consumer transaction selection included in the request. A consumer transaction selection need not be explicitly provided by the consumer. A merchant may provide such a selection, or the transaction selection may be derived from any other suitable information in the request for payment credentials.

Furthermore, in some embodiments determining the transaction type may include checking an account type associated with an account of the consumer and determining the transaction type at least partially based on the account type. In some embodiments, determining the transaction type may involve using both a transaction selection as set out above and an account type to determine the transaction type and therefore also the relevant payment credential format.

Two exemplary mobile phone implementations will now be described with reference to FIGS. 4 and 5. In the example shown in the diagram (400) of FIG. 4, the consumer (120) requests payment credentials to be provisioned to the electronic device (122) for conducting an e-commerce transaction.

At a first stage (410), the consumer (120) accesses a banking menu provided as a USSD-based service using the electronic device (122), which is a mobile phone in the example. The consumer (120) is presented with various banking options, and at a next stage (412) opts for the generation of one-time payment credentials.

At a next stage (420), the consumer (120) is required to select a transaction type for which the payment credentials must be generated. In this case and primarily for exemplary purposes, the consumer (120) desires payment credentials for conducting an e-commerce transaction, and selects the appropriate menu option at a next stage (422).

The consumer (120) is presented, at a further stage (430), with a notification that the request has been received and that authorization thereof is in process. One or more validation steps as described above may, of course, be included between the prior stages (420, 430).

The consumer (120) in this embodiment receives the appropriate payment credentials via one or more SMS messages. As shown in FIG. 4, at a final stage (440), the consumer (120) is provided with a single-use PAN, card expiry date and CVV for use in conducting an e-commerce transaction. In order to provide a higher level of security and in addition to the restriction on the number of times the payment credentials may be used, the payment credentials may have a limited "lifetime". For example, and as shown in FIG. 4, the payment credentials may only be valid for 10 minutes from the time that they are transmitted to the electronic device (122) of the consumer (120).

Figure 4:
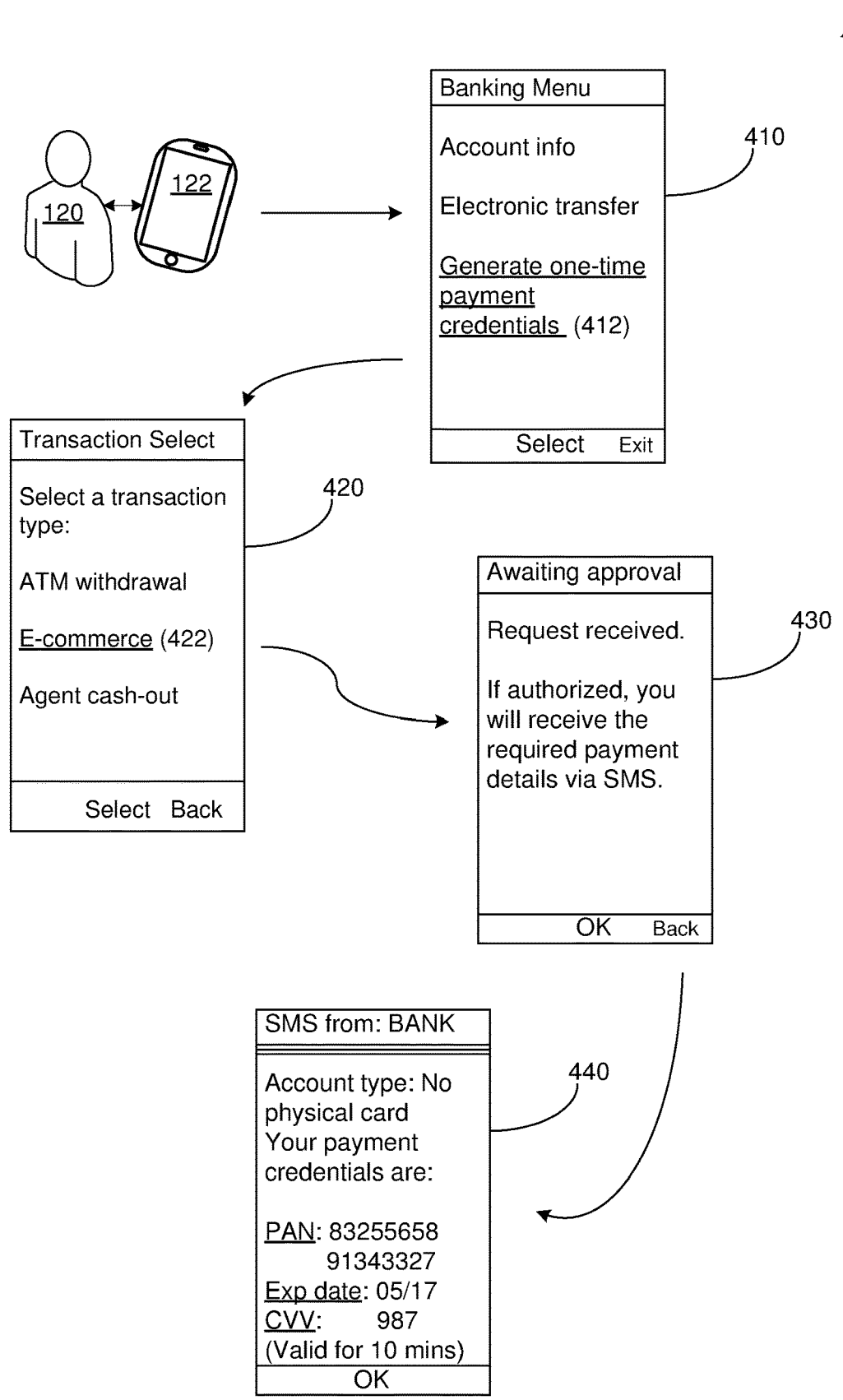
FIG. 4 is a flow diagram of an exemplary implementation of a method of provisioning payment credentials to a consumer according to the invention.
Figure 5:
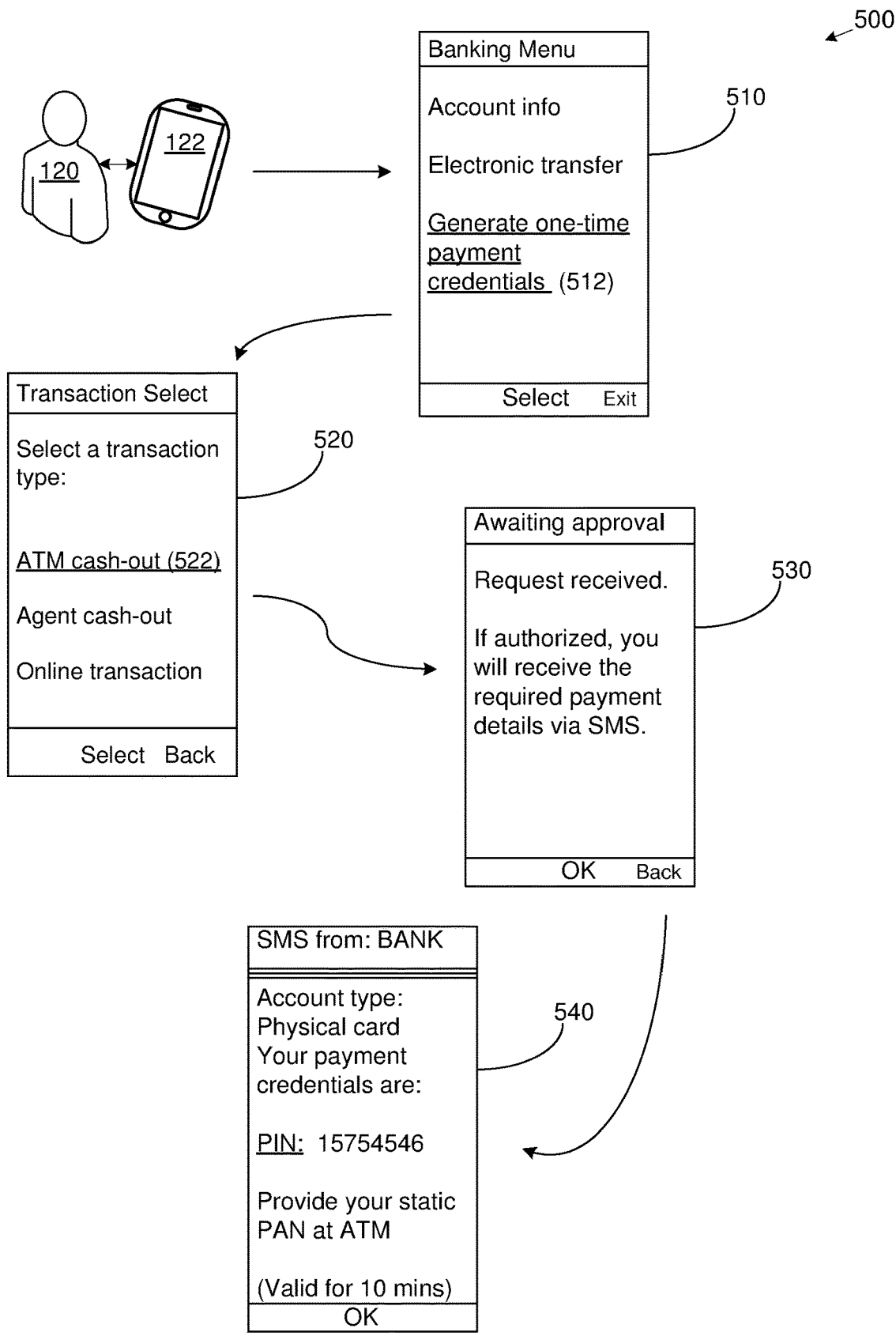
FIG. 5 is a flow diagram of an exemplary implementation of a method of provisioning payment credentials to a consumer according to the invention.

The SMS (440) shown in FIG. 4 also indicates an account type. In this case, the consumer (120) does not have a physical payment card, and does not have a PAN, card expiry date and CVV to use for the transaction, and is thus provided with these payment credentials via SMS.

In the example shown in FIG. 4, the payment credential format associated with an e-commerce transaction is a Primary Account Number (PAN), a card expiry date, and a Card Verification Value (CVV) when the consumer does not have a physical payment card. In this case, the consumer (120) does not have a static PAN to provide a merchant with, and therefore receives a one-time PAN.

In some embodiments, the account type may be an account associated with a corresponding physical payment card which has a static PAN. In such a case, the consumer (120) may not need to receive a PAN. The payment credential format associated with an e-commerce transaction for accounts having a physical payment card may be a card expiry date and a CVV. In such a case, the consumer (120) may, for example, when requesting payment credentials for an e-commerce transaction, only receive a card expiry date and a CVV for use with the static PAN. The consumer may of course be capable of using an expiry date and CVV of the physical payment card, but it is envisaged that transaction security may be enhanced by providing such credentials to the consumer via the remotely accessible server (110), for use with the static PAN.

In some embodiments, the payment credential format associated with an ATM cash withdrawal may be a PAN and a PIN when the account type is an account not associated with a physical payment card and therefore also not with a static PAN. Furthermore, the payment credential format associated with an ATM cash withdrawal may be only a PIN when the account type is an account associated with a corresponding physical payment payment card which has a static PAN. An example of such an implementation is shown in the flow diagram (500) of FIG. 5.

In this case, the consumer (120) requests payment credentials for conducting a cash-out or cash withdrawal transaction at an ATM, and the consumer (120) does not have an account which includes a physical payment card, also known as a "companion plastic card".

At a first stage (510), the consumer (120) accesses a banking menu provided as a USSD-based service using the electronic device (122), which is a mobile phone in this embodiment. The consumer (120) is presented with various banking options, and at a next stage (512) opts for the generation of one-time payment credentials.

At a next stage (520), the consumer (120) is required to select a transaction type for which the payment credentials must be generated. In this case and as an example, the consumer (122) desires payment credentials for conducting an ATM cash-out transaction, and selects the appropriate menu option at a next stage (522).

The consumer (120) is presented, at a further stage (530), with a notification that the request has been received and that authorization thereof is in process. The remotely accessible server (110) in this case determines, using details of the consumer account (114) that the consumer (120) has a physical payment card, and therefore does not require a PAN for completing the transaction. The remotely accessible server (110) then uses this information and the transaction type received from the electronic device (122) to determine the specific payment credential format required, which is only a PIN in this example.

The consumer (120) receives the appropriate payment credentials via one or more SMS messages. As shown in FIG. 5, at a next stage (540), the consumer (120) is provided with a single-use PIN which can be entered at a keypad of an ATM to complete the cash-out transaction, together with the static PAN the consumer (120) already possesses. In order to provide a higher level of security, the credentials are only valid for 10 minutes from the moment they are transmitted to the electronic device (122) of the consumer (120).

In some embodiments, the payment credential format associated with a cash-out transaction at a mobile money agent is a PAN only. In such a case, the consumer (120) may only need to request payment credentials if the consumer (120) does not have a physical payment card. If the consumer (120) has a physical payment card, the static PAN on the physical payment card may be used to perform the cash-out at the agent. Typically, the consumer (120) may be required to present some form of an identity document to validate its identity at the agent before the cash-out is completed. Such validation may also be carried out when completing a number of other transaction types.

A system and method for provisioning payment credentials to a consumer is therefore provided in which payment credentials, which may be one-time credentials or credentials valid for a plurality of transactions, are generated in a format directly dependent on the type of transaction which the consumer wishes to perform.

The method described may reduce security risks. For example, if payment credentials are intercepted by an unscrupulous party, the credentials can only be used for a specific type of transaction. This limits the scope of power the intercepting party has to perform fraudulent transactions, and may make subsequent transactions by such a party easier to anticipate and/or trace.

Furthermore, the system and method provided may bring about increased flexibility in terms of issuing payment credentials to consumers, particularly in the case of one-time payment credentials. This may allow issuers of payment credentials to tailor payment credentials to a desired transaction type according to the available payment acceptance points and financial infrastructure. For example, a PAN may only be provided to a consumer in a case where the consumer does not already have a static PAN, and a CVV and expiry date may only be provided when they are actually required for the transaction type which is to be conducted.

In other situations where only a PIN or unique code may typically be required, such as at an ATM or point of payment in a retail environment, the payment credentials may be tailored to fit the exact requirements of the financial infrastructure.

The technology described may serve to limit information sent to the consumer based on the consumer's specific requirements for the transaction.

It should be understood that the technology described herein may at least partially be implemented as a computer program product for provisioning payment credentials to a consumer. The computer program product may comprise a computer-readable medium having stored computer-readable program code for performing one or more of the steps of: receiving a request for payment credentials required to conduct a transaction, the request originating from an electronic device of a consumer, determining a transaction type associated with the transaction, the transaction type being one of a plurality of predefined transaction types wherein each transaction type is associated with a predefined payment credential format, obtaining payment credentials in the payment credential format associated with the determined transaction type, and transmitting the obtained payment credentials to the electronic device of the consumer for use in conducting the transaction The computer-readable medium may be a non-transitory computer-readable medium, and the computer-readable program code may be executable by a processing circuit.

Figure 6:
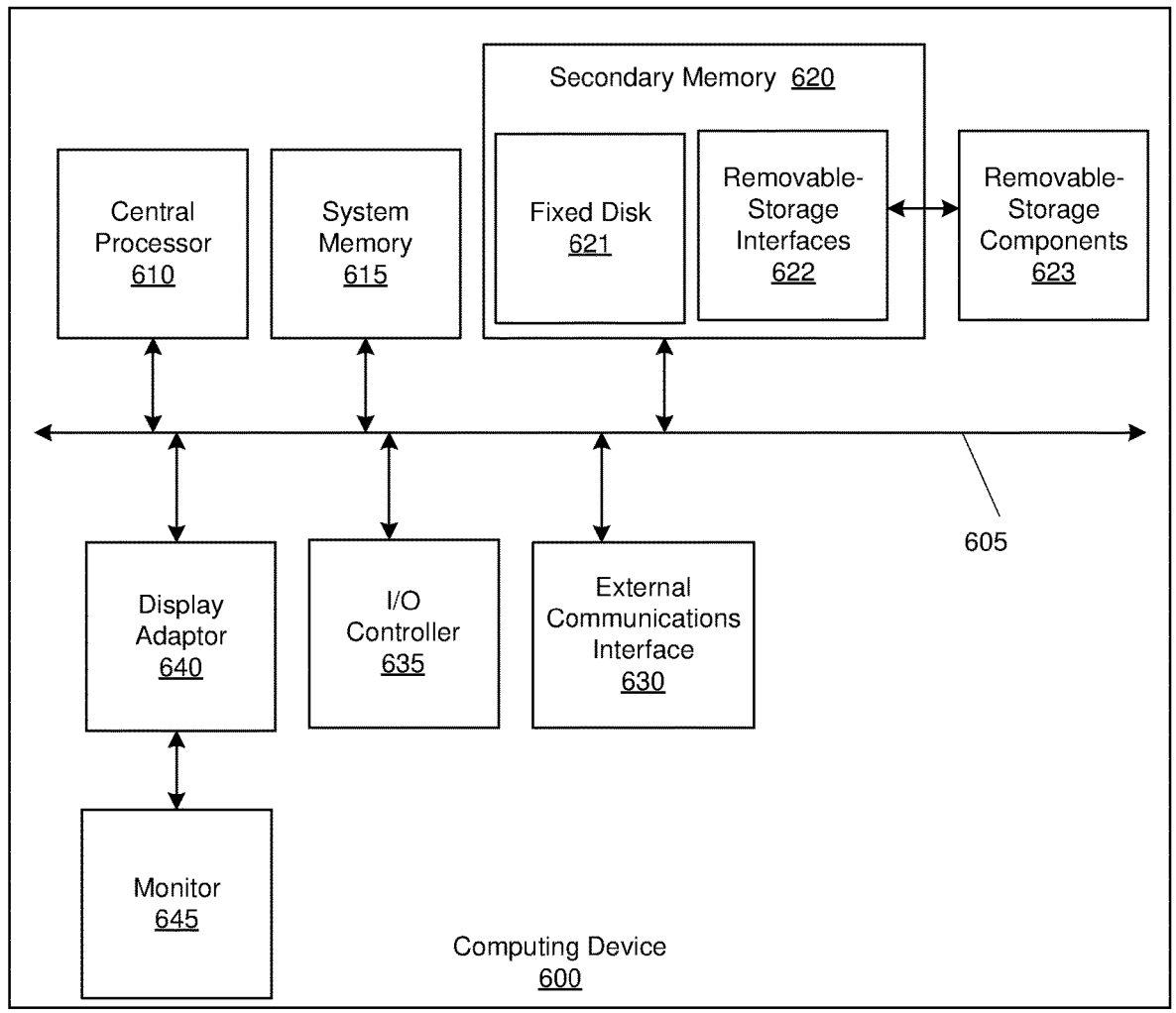
FIG. 6 illustrates a block diagram of a computing device that can be used in various embodiments of the invention.

FIG. 6 illustrates an example of a computing device (600) in which various aspects of the disclosure may be implemented. The computing device (600) may be suitable for storing and executing computer program code. The various participants and elements in the previously described system diagrams may use any suitable number of subsystems or components of the computing device (600) to facilitate the functions described herein.

The computing device (600) may include subsystems or components interconnected via a communication infrastructure (605) (for example, a communications bus, a cross-over bar device, or a network). The computing device (600) may include at least one central processor (610) and at least one memory component in the form of computer-readable media.

The memory components may include system memory (615), which may include read only memory (ROM) and random access memory (RAM). A basic input/output system (BIOS) may be stored in ROM. System software may be stored in the system memory (615) including operating system software.

The memory components may also include secondary memory (620). The secondary memory (620) may include a fixed disk (621), such as a hard disk drive, and, optionally, one or more removable-storage interfaces (622) for removable-storage components (623).

The removable-storage interfaces (622) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (622) may also be in the form of ports or sockets for interfacing with other forms of removable-storage components (623) such as a flash memory drive, external hard drive, or removable memory chip, etc.

The computing device (600) may include an external communications interface (630) for operation of the computing device (600) in a networked environment enabling transfer of data between multiple computing devices (600). Data transferred via the external communications interface (630) may be in the form of signals, which may be electronic, electromagnetic, optical, radio, or other types of signal.

The external communications interface (630) may enable communication of data between the computing device (600) and other computing devices including servers and external storage facilities. Web services may be accessible by the computing device (600) via the communications interface (630).

The external communications interface (630) may also enable other forms of communication to and from the computing device (600) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (610).

A computer program product may be provided by a non-transient computer-readable medium, or may be provided via a signal or other transient means via the communications interface (630).

Interconnection via the communication infrastructure (605) allows a central processor (610) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (600) either directly or via an I/O controller (635). These components may be connected to the computing device (600) by any number of means known in the art, such as a serial port.

One or more monitors (645) may be coupled via a display or video adapter (640) to the computing device (600).

Figure 7:
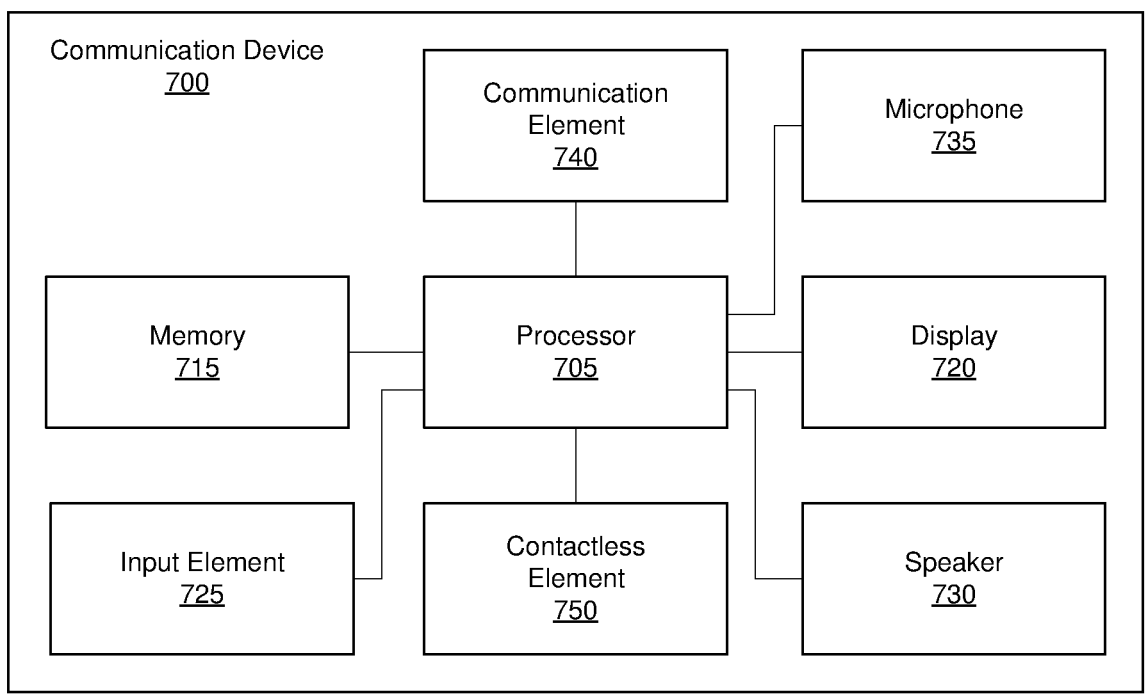
FIG. 7 illustrates a block diagram of a communication device that can be used in various embodiments of the invention.

FIG. 7 shows a block diagram of a communication device (700) that may be used in embodiments of the disclosure. The communication device (700) may be a cell phone, a feature phone, a smart phone, a satellite phone, or a computing device having a phone capability.

The communication device (700) may include a processor (705) (e.g., a microprocessor) for processing the functions of the communication device (700) and a display (720) to allow a user to see the phone numbers, messages and/or other information. The communication device (700) may further include an input element (725) to allow a user to input information into the device (e.g., input buttons, touch screen, etc.), a speaker (730) to allow the user to hear voice communication, music, etc., and a microphone (735) to allow the user to transmit his or her voice through the communication device (700).

The processor (705) of the communication device (700) may connect to a memory (715). The memory (715) may be in the form of a computer-readable medium that stores data and, optionally, computer-executable instructions.

The communication device (700) may also include a communication element (740) for connection to communication channels (e.g., a cellular telephone network, data transmission network, Wi-Fi network, satellite-phone network, Internet network, Satellite Internet Network, etc.). The communication element (740) may include an associated wireless transfer element, such as an antenna.

The communication element (740) may include a subscriber identity module (SIM) in the form of an integrated circuit that stores an international mobile subscriber identity and the related key used to identify and authenticate a subscriber using the communication device (700). One or more subscriber identity modules may be removable from the communication device (700) or embedded in the communication device (700).

The communication device (700) may further include a contactless element (750), which is typically implemented in the form of a semiconductor chip (or other data storage element) with an associated wireless transfer element, such as an antenna. The contactless element (750) may be associated with (e.g., embedded within) the communication device (700) and data or control instructions transmitted via a cellular network may be applied to the contactless element (750) by means of a contactless element interface (not shown). The contactless element interface may function to permit the exchange of data and/or control instructions between mobile device circuitry (and hence the cellular network) and the contactless element (750).

The contactless element (750) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (700) and an interrogation device. Thus, the communication device (700) may be capable of communicating and transferring data and/or control instructions via both a cellular network and near field communications capability.

The data stored in the memory (715) may include: operation data relating to the operation of the communication device (700), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (700) to selected receivers.

The communication device (700) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method conducted at a remotely accessible server including a processor and a memory component for storing computer-executable instructions and comprising the steps of:
   receiving, over a first communications network, a request for payment credentials required to conduct a transaction using a payment account, the request originating from an electronic device;
   determining a transaction type associated with the transaction, the transaction type being one of a plurality of predefined transaction types including an Automated Teller Machine (ATM) cash withdrawal, an agent cash-out transaction, or an e-commerce transaction, wherein each transaction type is associated with one or more predefined payment credential components, wherein the determined transaction type includes the Automated Teller Machine (ATM) cash withdrawal;
   determining payment credential components required for the determined transaction type, wherein the payment credential components include a first set of payment credential components identifying the payment account, the first set of payment credential components is different than a second set of payment credential components identifying the payment account, wherein the second set of payment credential components are associated with a different transaction type, wherein the payment credential components associated with the ATM cash withdrawal include a Primary Account Number (PAN) and a Personal Identification Number (PIN), wherein presenting the payment credential components to the ATM effects a cash withdrawal at the ATM;
   generating payment credentials conforming to the determined payment credential components; and
   transmitting the payment credentials to the electronic device by way of one or more Short Message Service (SMS) messages over a second communications network for use in successfully conducting the transaction using the payment account, wherein the transaction fails if the second set of payment credential components are used, wherein the second communications network include a cellular network.

2. The method as claimed in claim 1, wherein the request for payment credentials includes a consumer transaction selection, and wherein the transaction type is determined at least partially based on the consumer transaction selection included in the request.

3. The method as claimed in claim 1, wherein the step of determining the transaction type associated with the transaction includes checking an account type associated with an account of a consumer and determining the transaction type at least partially based on the account type.

4. The method as claimed in claim 3, wherein the account type is one of an account associated with a corresponding physical payment card and an account not associated with a corresponding physical payment card, and wherein different predefined payment credential components are respectively associated with an account associated with a corresponding physical payment card and an account not associated with a corresponding physical payment card.

5. The method as claimed in claim 3, wherein the account is a mobile wallet account.

6. The method as claimed in claim 1, wherein the remotely accessible server is operated by a mobile banking system and wherein the transaction is a mobile banking transaction.

7. The method as claimed in claim 1, wherein the request for payment credentials is a request for single-use payment credentials.

8. The method as claimed in claim 1, wherein the request for payment credentials includes a consumer identifier in the form of an identifier of the electronic device.

9. The method as claimed in claim 1, wherein the electronic device is a mobile phone of a consumer.

10. The method as claimed in claim 1, wherein the payment credential components associated with the determined transaction type includes one or a combination of: a bank account number, a Primary Account Number (PAN), a pseudo PAN, a card expiry date, a Card Verification Value (CVV), a passcode, a passphrase, a Personal Identification Number (PIN), a token, a barcode, and a Quick Response (QR) code.

11. The method as claimed in claim 4, wherein the account type is an account associated with a corresponding physical payment card, the physical payment card having a static Primary Account Number (PAN), wherein the determined transaction type includes the Automated Teller Machine (ATM) cash withdrawal, and wherein the payment credential components associated with the ATM cash withdrawal is a Personal Identification Number (PIN) only.

12. The method as claimed in claim 1, wherein the determined transaction type includes the e-commerce transaction and the payment credential components associated with the e-commerce transaction is a Primary Account Number (PAN), a card expiry date, and a Card Verification Value (CVV).

13. The method as claimed in claim 4, wherein the account type is an account associated with a corresponding physical payment card, the physical payment card having a static Primary Account Number (PAN), wherein the determined transaction type includes the e-commerce transaction and wherein the payment credential components associated with the e-commerce transaction is a card expiry date and a Card Verification Value (CVV).

14. The method as claimed in claim 1, wherein the determined transaction type includes the agent cash-out transaction, and wherein the payment credential components associated with the agent cash-out transaction is a Primary Account Number (PAN).

15. A system comprising a remotely accessible server including a processor and a memory component for storing computer-executable instructions in communication with an electronic device, the remotely accessible server including:
   a request receiving component for receiving, over a first communications network, a request for payment credentials required to conduct a transaction using a payment account, the request originating from the electronic device;
   a type determining component for:
   determining a transaction type associated with the transaction, the transaction type being one of a plurality of predefined transaction types including an Automated Teller Machine (ATM) cash withdrawal, an agent cash-out transaction, or an e-commerce transaction, wherein each transaction type is associated with one or more predefined payment credential components, wherein the determined transaction type includes the Automated Teller Machine (ATM) cash withdrawal,
   determining payment credential components required for the determined transaction type, wherein the payment credential components include a first set of payment credential components identifying the payment account, the first set of payment credential components is different than a second set of payment credential components identifying the payment account, wherein the second set of payment credential components are associated with a different transaction type, wherein the payment credential components associated with the ATM cash withdrawal include a Primary Account Number (PAN) and a Personal Identification Number (PIN), wherein presenting the payment credential components to the ATM effects a cash withdrawal at the ATM;

a credential generating component for generating payment credentials conforming to the determined payment credential components; and a transmitting component for transmitting the payment credentials to the electronic device by way of one or more Short Message Service (SMS) messages over a second communications network for use in successfully conducting the transaction using the payment account, wherein the transaction fails if the second set of payment credential components are used, wherein the second communications network include a cellular network.

16. The method as claimed in claim 1, wherein the step of determining payment credential components required for the determined transaction type further comprises:

searching a database for payment credential components associated with the determined transaction type, wherein the database stores payment credential components associated with different transaction types; and identifying the payment credential components required for the determined transaction type at the database.

17. The method as claimed in claim 1, wherein the payment credentials transmitted to the electronic device by way of one or more Short Message Service (SMS) messages expire after a predetermined amount of time.

* * * * *